United States Patent [19]

Bopp

[11] 4,276,251
[45] Jun. 30, 1981

[54] POWER AND CONTROL CABLES HAVING FLEXIBLE POLYOLEFIN INSULATION

[75] Inventor: Louis A. Bopp, Long Branch, N.J.

[73] Assignee: General Cable Corporation, Greenwich, Conn.

[21] Appl. No.: 944,983

[22] Filed: Sep. 22, 1978

Related U.S. Application Data

[63] Continuation-in-part of Ser. No. 760,017, Jan. 17, 1977, abandoned.

[51] Int. Cl.³ .......................... B29F 3/10; B29H 9/10; B29C 27/24
[52] U.S. Cl. .................................. 264/174; 264/211; 174/110 AR; 174/110 PM; 174/120 AR; 525/322
[58] Field of Search .............................. 427/117, 120; 174/110 AR, 110 PM, 120 AR; 264/174, 211; 528/240

[56] References Cited

U.S. PATENT DOCUMENTS

| | | | |
|---|---|---|---|
| 3,455,752 | 7/1969 | Grey et al. .......................... | 156/51 |
| 3,569,610 | 10/1969 | Garner et al. ................. | 174/110 AR |
| 3,749,817 | 7/1973 | Shiga et al. .................... | 174/110 PM |
| 3,860,686 | 1/1975 | Myers ................................... | 264/174 |
| 3,885,085 | 5/1975 | Bahden et al. ................. | 174/120 AR |
| 4,123,417 | 10/1978 | Finberg ............................... | 525/240 |

*Primary Examiner*—Ronald H. Smith
*Assistant Examiner*—Richard Bueker
*Attorney, Agent, or Firm*—Roy C. Hopgood; John M. Calimafde; Charles W. Neill

[57] ABSTRACT

This invention is an improved insulation for electric cables and an improved method of making the insulation. Cross linked polyethylene insulation is too stiff, particularly in high voltage cables which require a thick layer of insulation. Copolymers of polypropylene have electrical properties substantially equal to those of polyethylene, but do not have the necessary physical strength and have to be filled with clay or other filler that provides the required strength but degrades the electrical characteristics. A novel feature of this method is the utilization of the screw of the extruder to effect a mixing of the ingredients in an improved polymer system for cable insulation.

8 Claims, 2 Drawing Figures

POWER AND CONTROL CABLES HAVING FLEXIBLE POLYOLEFIN INSULATION

RELATED APPLICATION

This application is a continuation-in-part of my application Ser. No. 760,017, filed Jan. 17, 1977, now abandoned.

BACKGROUND AND SUMMARY OF THE INVENTION

Unfilled chemically cross-linked polyethylene has long been recognized by the power cable industry as an insulation material characterized by very low dielectric losses, high dielectric strength, and excellent physical properties. Its most undesirable properties are relatively high hardness and minimum flexibility. Installation costs increase substantially due to the longer time involved making splices and terminations. Compositions based upon ethylene-propylene copolymers and terpolymers and other elastomers have found application in power cables because of their inherently greater flexibility and ease of installation, substantially reducing those costs.

Ethylene-propylene rubbers have been amorphous materials and required reinforcement from added fillers such as hard calcined clays to achieve their necessary physical strength to be used in insulation. Polyethylene, being crystalline in structure, does not require additional reinforcement, therefore unfilled compositions are practical and are used in most power cable applications above 2 kV rating. An unfilled polymer system provides the highest degree of electrical properties, and conversely, the addition of fillers detracts from the inherently good electrical properties of ethylene-propylene rubbers in proportion to the amount of filler employed.

In my invention, both the highest degree of electrical characteristics of an unfilled polymer system and the inherent flexibility of rubber have been combined into a composition suited to power cable applications which include both low and high voltage varieties. This has been accomplished by physically combining polyethylene and an ethylene propylene copolymer or ethylene propylene terpolymer together with a suitable antioxidant and a peroxide curing agent to bring about a cross-linked composition. The ratios in the polymer system can be varied to provide more or less flexibility as desired without appreciably altering other physical properties and without significant changes in electrical characteristics. The resultant compounds are inherently tough, flexible and of the highest degree of electrical properties comparable to those of a typical unfilled chemically cross-linked polyethylene. The cross-linking itself can also be achieved in the absence of chemical cross-linking by irradiation curing.

Based upon limited data available at this time, the life span of the compounds included in this invention will exceed the normal life span of typical unfilled chemically cross-linked polyethylene compounds. Other properties such as low temperature flexibility, weatherability, resistance to deformation and mechanical damage are at least the equivalent of cross-linked polyethylene and typical ethylene propylene copolymers.

A study of a-c dielectric strength has indicated that the new compositions exceed ethylene propylene rubber formulations by a marked degree and slightly surpass the breakdown voltage achieved by the unfilled cross-linked polyethylene.

This invention includes a novel method of mixing the components of the composition. Raw polyethylene and ethylene propylene copolymer, preferably with 15% crystallinity, are purchased in the form of pellets. These original pellets remain intact throughout the entire preblending cycle which both intermixes the polymers themselves and provides for the addition of the anti-oxidant and peroxide curing agent by absorption through the pellet surfaces. This is a modification of the patented Furukawa (U.S. Pat. No. 3,455,752) mixing process for cross-linkable polyethylene. Modifications in the mixing are necessary due to the dual polymer system involved. Final mixing is achieved by the screw in the barrel of the extruder which homogenizes the ingredients of the polymer system to form the insulation before extruding it on the final cable product. At this stage, the polymers are fluxed into each other forming a complete matrix, and the additives are uniformly dispersed in the polymer blend. This is a distinct difference from the original Furukawa process which does not require two polymers to be fluxed in the final extrusion operation.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
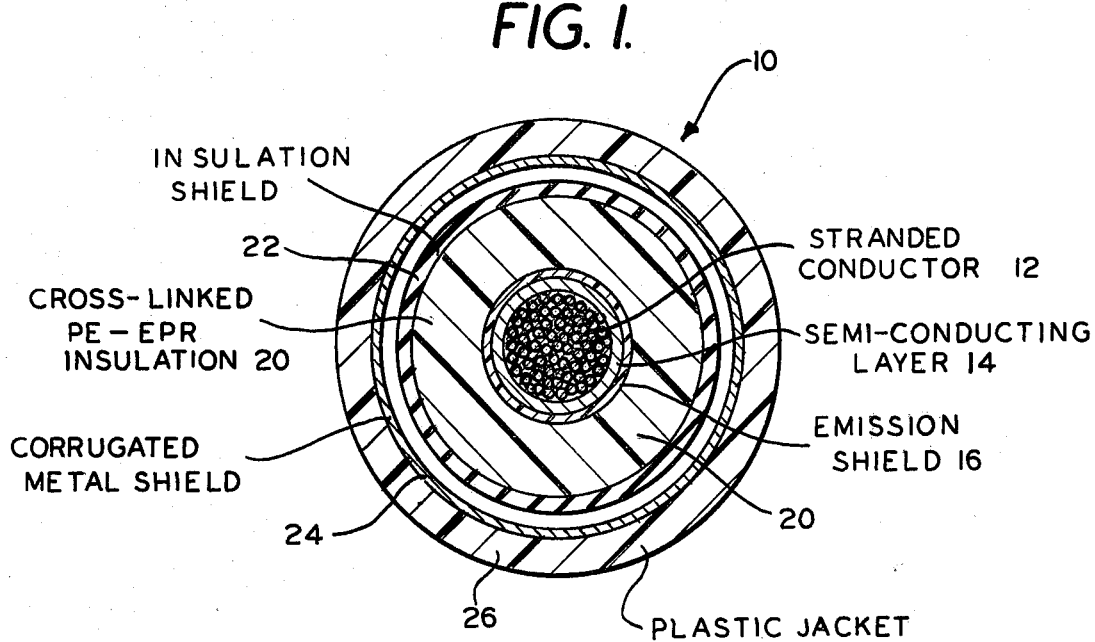
FIG. 1 is a transverse cross-section through a cable made in accordance with this invention.

FIG. 1 shows a high-voltage power cable 10 having a center stranded conductor 12 covered by a semi-conducting conductor shield 14. Preferably, an emission shield 16 is applied over the outside of the conductor shield 14.

The insulation for the cable, which insulation is designated by the reference character 20, is applied over the emission shield 16, or the conductor shield 14, if there is no emission shield. The insulation 20 is a mixture of polyethylene and ethylene propylene copolymer.

The ethylene propylene copolymer is not filled as was the ethylene propylene rubber of U.S. Pat. No. 3,579,610, in which I was a co-inventor. The EPR of patent '610 was 40% ethylene, but the ethylene propylene copolymer of this invention is 78 ±3% ethylene; and has 15% crystallinity but the EPR of patent '610 was entirely amorphous. Ordinarily, ethylene propylene rubber cannot be used for insulating electric cables unless a filler is added to the ethylene propylene rubber to give it the physical properties necessary for use in a cable, such as abrasion resistance, cut-through resistance and temperature characteristics. When subjected to a higher temperature for curing, the polyethylene and ethylene propylene rubber are cross-linked with themselves and to each other.

The polyethylene is crystalline and imparts to the ethylene propylene copolymer the properties that it needs for use as a cable insulation; and these improved physical properties are obtained without impairing the electrical characteristics of the ethylene propylene copolymer. Fillers have been used to impart the required physical properties but at the expense of the electrical characteristics which are essential for best insulating results. The benefits which this invention derives electrically are due to the fact that the system does not contain reinforcing mineral fillers.

The proportion of polyethylene to ethylene propylene copolymer can be a ratio of 1:1. However, the proportions can be changed over a wide range. The amount of polyethylene must be sufficient to provide the insulation with the necessary physical strength; but the ethylene propylene copolymer must be present in sufficient amount to substantially increase the flexibility of the polyethylene for the reasons explained in the summary at the beginning of this specification. The ratio of the polyethylene to the ethylene propylene copolymer can vary from 80:20 to 20:80. The preferred range, however, is 60:40 to 40:60.

Referring again to FIG. 1. the insulation 20 is covered with a semi-conducting insulation shield 22 over which a corrugated metal shield 24 is applied. This corrugated metal shield 24 is preferably made by folding a transversely corrugated metal tape longitudinally around the cable core. Other types of shield can be used, such as metal tape or wire shield. An outer jacket 26 is extruded over the metal shield 24.

Figure 2:
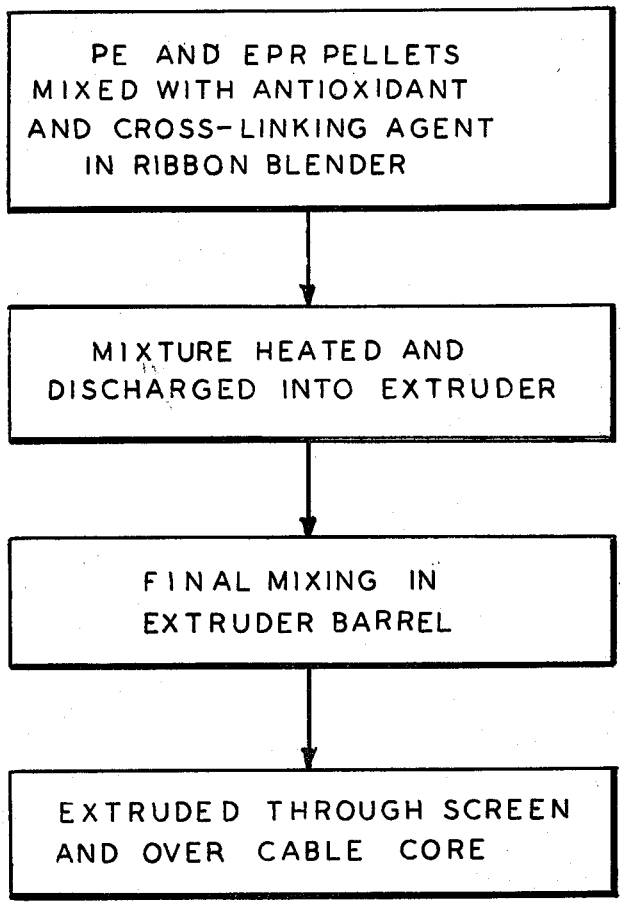
FIG. 2 is a flow diagram illustrating the method of this invention.

FIG. 2 is a flow diagram illustrating the successive steps in the preferred method of this invention. In order to obtain economy in the manufacture of the cable shown in FIG. 1, polyethylene pellets, which are hard at room temperature, and ethylene propylene copolymer pellets, which are soft and rubbery at room temperature, are placed in a ribbon blender which mixes them together as pellets. This mixture is then transferred to an extruder which is heated.

The heat in the extruder barrel and the work done on the pellets by the screw in the extruder barrel softens the pellets and thoroughly mixes the materials of the pellets together so that they are fluxed into each other forming a complete homogeneous matrix.

If additional ingredients, such as an antioxidant and peroxide curing agent, are added to the pellets, these additional ingredients diffuse through the walls of the pellets, and mix with the polyethylene and ethylene propylene copolymer without waiting for the pellets to be fluxed into each other by the extruder.

The conductor 12 passes through the extruder head via a guider tip, and the insulation is extruded over the conductor at the tip in accordance with conventional extrusion practice.

This invention does permit an improvement in the extrusion process which has not been possible with insulation made entirely of ethylene propylene rubber and filler.

The insulating material of this invention can be forced through a fine mesh screen or plate in the extruder at a location between the end of the screw and the tip of the extruder. The mixture of the two base polymers, polyethylene and ethylene propylene copolymer, can be forced through a screen having the equivalent of a 325 mesh, and this eliminates from the insulation any solid impurities 1.7 mils in size. The elimination of particles larger than 1.7 mils, or the breaking-up of the particles which do pass through the screen, greatly increase the effectiveness of the insulation by making it capable of withstanding higher voltage stress per mil of insulation thickness.

The preferred material for the ethylene propylene copolymer is available from Exxon Chemical Co., and its address is P.O. Box 201, Florham Park, N.J. 07932. The particular copolymer that I have used for the invention described in this specification is designated by the Exxon Chemical Co. as "Vistalon 702", and it is approximately 15% crystalline. Exxon Chemical Co. makes another copolymer of ethylene and propylene designated as "Vistalon 404" which has substantially no crystallinity. This amorphous copolymer cannot be used for my invention becuase it requires a filler in order to have the strength necessary for the insulation.

An equivalent material to that claimed in the specification is a copolymer of an ethylene and propylene in which diene is added to make a terpolymer. This material designated as "Nordel 2722" is a available from DuPont of Wilmington, Del. For purposes of the claims this Nordel 2722, without filler, is to be considered a mechanical equivalent of the copolymer of ethylene and propylene with some crystallinity. There may be other products that I do not know of which are chemical equivalents of the copolymers of ethylene and propylene with crystallinity sufficient for making insulation when mixed with polyethylene and without any filler in the insulation.

The expression "ethylene propylene copolymer" is used herein in a broad sense to include such copolymers even though additional copolymerized monomer may be present in the Nordel ethylene diene terpolymer described above.

The expression "unfilled" as used herein, designates an insulation in which no material, usually clay, has been added to the insulation conpound for the purpose of increasing the mechanical strength of the insulation. Such filler degrades the electrical characteristics of the insulation.

The preferred embodiments of the invention have been illustrated and described, but changes and modifications can be made and some features can be used in different combinations without departing from the invention as defined in the claims.

What is claimed is:

1. The method of making a layer of insulation for an electric power cable which comprises mixing together pellets of polyethylene and ethylene propylene copolymer, antioxidant and cross-linking agent in which the ingredients are mixed non-homogeneously, in a ribbon blender in the absence of any mineral reinforcing filler in the ribbon blender, then introducing the blended polymer ingredients and the anti-oxidant and cross-linking agents into an extruder housing having a feed screw in the extruder housing as the ingredients are advanced through said extruder housing by the feed screw, simultaneously homogenizing and extruding the ingredients to coat an electrical conductor with the mixture of polyethylene, and the copolymer of ethylene and propylene, said copolymer being approximately 15% crystalline, and containing no filler that increases the physical properties of the insulation, adding to said copolymer polyethylene to supply additional crystallinity to the insulation, the polyethylene forming with said ethylene-propylene copolymer, a polymer system having electrical characteristics substantially equal to those of polyethylene and having improved physical characteristics of greater toughness than the copolymer, and greater flexibility than polyethylene.

2. The method described in claim 1 characterized by mixing polymer pellets of the copolymer of ethylene and propylene, and pellets of polyethylene, all of the polymers being of electrical insulation grade with a cross-linking agent and an anti-oxidant, homogenizing the mixture and extruding the mixture over a core of a cable and then cross-linking the flexible polymer system.

3. The method described in claim 1 characterized by the insulation being made without using a non-polymer filler for increasing the physical strength of the insulation, and relying on the crystallinity of the copolymer and polyethylene to obtain the required physical strength and toughness for an insulated electric power cable.

4. The method described in claim 1 characterized by improving the flexibility of cross-linked polyethylene insulated electric cables which includes compounding the insulation from a mixture of polyethylene and ethylene propylene copolymer in the proportions between 80:20 and 20:80 and applying the compound as insulation around a cable conductor.

5. The method described in claim 1 characterized by the proportions of polyethylene and ethylene propylene rubber being between 60:40 and 40:60.

6. The method described in claim 1 characterized by blending together pellets of polyethylene and ethylene propylene copolymer and supplying the blend to a heated extruder through which the conductor passes, thoroughly mixing the polyethylene and ethylene propylene copolymers in the extruder by the stirring and working of the polyethylene and ethylene propylene copolymers by a screw in the barrel of an extruder that forces material in the extruder barrel toward the discharge end thereof at which the mixed polyethylene and ethylene propylene copolymer is extruded over the outside surface of the conductor, characterized by putting chemical cross-linking agents and anti-oxidant with the polyethylene and ethylene propylene copolymers while the latter are still in the form of pellets, distributing the chemical cross-linking agent and the anti-oxidant by dispersion through the walls of the pellets of the polyethylene and ethylene propylene copolymers, blending the polyethylene and ethylene propylene copolymers together in a ribbon blender before placing them into the extruder.

7. The method described in claim 1 characterized by making a fluxed blend of polyethylene, ethylene propylene copolymer, anti-oxidant and cross-linking agent by the mixing action of an extruder in which the ingredients are mixed, passing the fluxed blend through a screen pack, and then over an extrusion tip and through an extrusion die of the extruder.

8. The method described in claim 7 characterized by the screen being as small as a 325 mesh screen for eliminating extraneous particles greater than 1.7 mils in extent, the screen being located between the discharge end of the screw and the discharge end of the extruder tip.

* * * * *